United States Patent
Ronsen

(10) Patent No.: US 9,381,955 B2
(45) Date of Patent: Jul. 5, 2016

(54) APPARATUS AND METHOD TO RETROFIT A REFRIGERATION COMPARTMENT WITH INCREASED VOLUME IN A VAN

(71) Applicant: David Ronsen, Encinitas, CA (US)

(72) Inventor: David Ronsen, Encinitas, CA (US)

(*) Notice: Subject to any disclaimer, the term of this patent is extended or adjusted under 35 U.S.C. 154(b) by 15 days.

(21) Appl. No.: 14/313,784

(22) Filed: Jun. 24, 2014

(65) Prior Publication Data

US 2014/0375074 A1    Dec. 25, 2014

Related U.S. Application Data

(60) Provisional application No. 61/838,774, filed on Jun. 24, 2013.

(51) Int. Cl.
| | |
|---|---|
| *B62D 33/04* | (2006.01) |
| *B60P 3/20* | (2006.01) |
| *B60G 15/06* | (2006.01) |
| *B62D 65/00* | (2006.01) |

(52) U.S. Cl.
CPC .............. *B62D 33/048* (2013.01); *B60G 15/06* (2013.01); *B60P 3/20* (2013.01); *B62D 65/00* (2013.01); *B60G 2204/61* (2013.01); *B60G 2206/99* (2013.01); *Y10T 29/49716* (2015.01)

(58) Field of Classification Search
CPC ...... B62D 33/048; B62D 65/00; B60G 15/06; B60G 2204/61; B60G 2206/99; B60P 3/20; Y10T 29/49716
See application file for complete search history.

(56) References Cited

U.S. PATENT DOCUMENTS

| | | | | |
|---|---|---|---|---|
| 4,917,431 A * | 4/1990 | McDonald | ............. | B62D 33/04 296/39.1 |
| 5,741,042 A * | 4/1998 | Livingston | ........... | B62D 29/045 220/1.5 |
| 5,772,276 A * | 6/1998 | Fetz | ................... | B62D 25/2054 296/181.2 |
| 6,142,550 A * | 11/2000 | Blyth | ..................... | B60R 13/01 296/214 |
| 2010/0207427 A1* | 8/2010 | Reel | ......................... | B60N 2/34 296/190.02 |
| 2010/0213740 A1* | 8/2010 | Huang | ................. | B62D 33/046 296/193.04 |
| 2011/0148134 A1* | 6/2011 | Gerhardt | .................. | B60P 7/14 296/24.43 |

OTHER PUBLICATIONS

"Changin' Gears—Trading City Lights for the RV Lifestyle"; www.changingears.com/rv-sec-tow-vehicles-classes.shtml; Copyright 2005-2014; 2 pages.

* cited by examiner

*Primary Examiner* — Lori L Lyjak

(57) ABSTRACT

A van includes modified a first side panel of the van. An exterior portion of the first side panel forms a first exterior side of the van. The van includes a second side panel of the van. An exterior portion of the second side panel forms a second exterior side of the van. The van also includes a planar floor surface configured to extend from the first side panel to the second side panel for an entire length of a cargo area. The cargo area is defined by the first side panel, the second side panel, and the planar floor surface of the van.

20 Claims, 4 Drawing Sheets

APPARATUS AND METHOD TO RETROFIT A REFRIGERATION COMPARTMENT WITH INCREASED VOLUME IN A VAN

CROSS-REFERENCE TO RELATED APPLICATIONS

The present application claims priority to U.S. Provisional Patent Application Ser. No. 61/838,774, filed Jun. 24, 2013, entitled "APPARATUS FOR A REFRIGERATION COMPARTMENT WITH INCREASED VOLUME," the content of which is hereby incorporated by reference.

TECHNICAL FIELD

This application relates to a cargo vans, and more specifically to expanded cargo bay area of a van.

BACKGROUND

Cargo vans, such as American cargo vans, are vans used to transport cargo, or other items, that are smaller and cheaper to operate than a full size delivery trucks. Cargo vans are typically referred to by their carrying weight capacity. Although the carrying capacity of the cargo vans no longer correlate to the common names, cargo vans are often referred to as ½ ton, ¾ ton and 1.5 ton.

SUMMARY

This disclosure provides a method and system for retrofitting a refrigerated compartment in the cargo bay of a van style vehicle.

In certain embodiments, a van is provided. The van includes a first side panel of the van. An exterior portion of the first side panel forms a first exterior side of the van. The van also includes a second side panel of the van. An exterior portion of the second side panel forms a second exterior side of the van. The van includes a planar floor surface configured to extend from the first side panel to the second side panel for an entire length of a cargo area. The cargo area is defined by the first side panel, the second side panel, and the planar floor surface of the van.

In certain embodiments, a method for converting a van is provided. The method includes modifying a wheel well in the cargo bay of the van. The method also includes modifying a suspension system of a van. The method also includes installing insulated planar floor surface configured to extend from a first side panel of the van to a second side panel of the van for an entire length of a cargo area. The cargo area is defined by the first side panel, the second side panel, and the planar floor surface of the van. An exterior portion of the first side panel forms a first exterior side of the van and an exterior portion of the second side panel forms a second exterior side of the van.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged vehicle system.

In the cargo van, wheel wells protrude into the cargo bay of the van. The purpose of having wheel wells is to allow the floor of the van to be lower to the ground, such as approximately 30" from a top of the floor to a ground surface, while still providing clearance for the wheel from striking the bottom of the van. The low level floor of the van increases the amount of storage space in the cargo bay while also lowering the van's center of gravity. Lowering the center of gravity is ideal for increasing the stability or automobile handling of the van while in transport and lowering a chance that the van will tip-over while cornering or swerving. While the low floor is important for increasing the storage space and stability, the wheel wells reduce the amount of interior flat floor space. The lowered floor may increase a vertical storage space but the protrusions of the wheel wells results in a reduction of the overall storage space and the usable floor storage space is reduced in many cargo transportation applications. When pallets or any type of shipping containers are stored in the cargo bay, the space around the wheel wells is lost. Extra space in cargo transportation is not desirable, as shipping companies desire to maximize shipped cargo. The extra space also may require shippers to stow goods to keep from shifting. Goods that shift in transit increase the risk of damage to the van and also the goods themselves.

Embodiments of the present disclosure provide method and apparatus for the up-fitting and modification of a cargo van to maximize a usable storage space of the cargo bay. Maximizing the usable storage space is important for the shipping industry, especially with refrigerated shipping. Cooling empty space is undesirable for energy and costs considerations. Therefore, providing a flat surface across the floor of the refrigerated cargo bay of a van reduces the energy and cost losses associated with the empty space.

Figure 1:
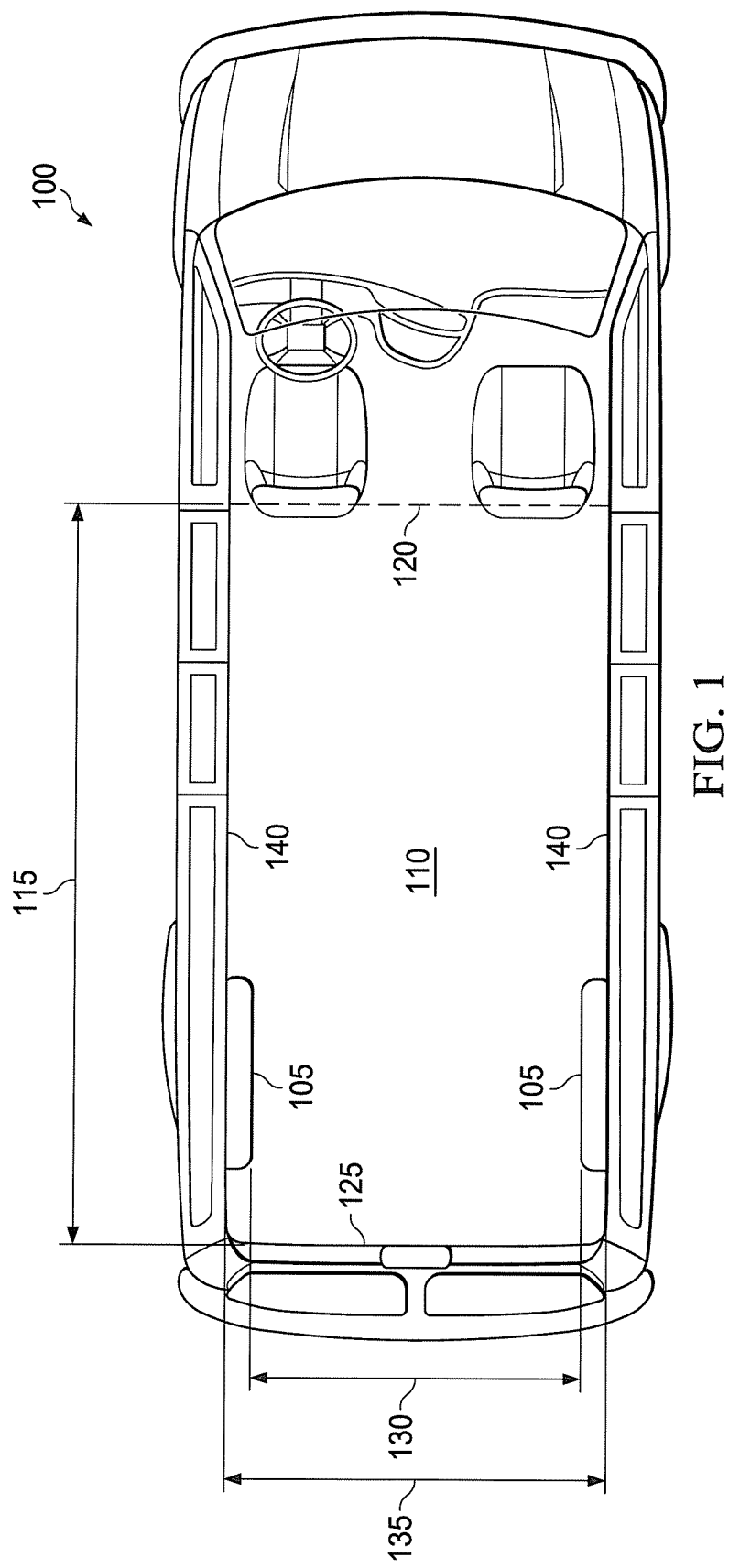
FIG. 1 illustrates a panel cargo van according to the present disclosure.

FIG. 1 illustrates a panel cargo van according to the present disclosure. The embodiment of the cargo van 100 is for illustration only. Other embodiments could be used without departing from the scope of the present disclosure.

In the example shown in FIG. 1, the cargo van 100 is a multi-wheel vehicle configured to carry cargo. The United States Department of Transportation (USDOT) classifies trucks and cargo vehicles according to the Gross vehicle weight rating (GVWR) into one of eight classes:

Class 1—GVWR ranges from 0 to 6,000 pounds (0 to 2,722 kg);
Class 2—GVWR ranges from 6,001 to 10,000 pounds (2,722 to 4,536 kg);
Class 3—GVWR ranges from 10,001 to 14,000 pounds (4,536 to 6,350 kg);
Class 4—GVWR ranges from 14,001 to 16,000 pounds (6,351 to 7,257 kg);
Class 5—GVWR ranges from 16,001 to 19,500 pounds (7,258 to 8,845 kg);
Class 6—GVWR ranges from 19,501 to 26,000 pounds (8,846 to 11,793 kg);
Class 7—GVWR ranges from 26,001 to 33,000 pounds (11,794 to 14,969 kg); and
Class 8—GVWR is anything above 33,000 pounds (14,969 kg).

In certain embodiments, the cargo van 100 is a class 1 van as defined by the USDOT. In certain embodiments, the cargo van 100 is a European style van. The European style van refers to tall, skinny vans that have been used outside of North America for many decades and that are now becoming available in the United States.

In the example shown in FIG. 1, the cargo van 100 includes wheel wells 105 that protrude into a cargo bay 110 of the van 100. The wheel wells 105 are configured to provide a clearance of a wheel from the body of the cargo van 100. The wheel wells 105 also enable the cargo van 100 to have a lower profile and enable the cargo bay 110 to be lowered with respect to the wheels to provide for more vertical storage capability. The wheel wells 105 in most vans protrude into the cargo bay 110 as a half disk shape. While the overall area of the cargo bay 110 of the cargo van 100 is increased vertically, the wheel wells 105 create protrusions in the floor of the cargo bay 110 that reduce a horizontal storage capability of the cargo van 100. That is, these protrusions diminish the amount of flat surface on the floor of the cargo bay 100.

A floor of the cargo van 100 extends a length 115 of the cargo bay 110 from a front 120 of the cargo bay to a rear of the cargo bay 125. The usable space 130 between the wheel wells 105 is less than a usable space 135 between the van side walls 140. Therefore, any cargo stored in the cargo bay 100 must be stored forward of the wheel wells 105 or be dimensioned to fit within the usable space 130 between the wheel wells 105. Alternatively, depending upon the cargo size, the cargo may be required to be placed atop the wheel wells 105 such that the cargo is not in a stable position on the floor of the cargo van 100.

Figure 2:
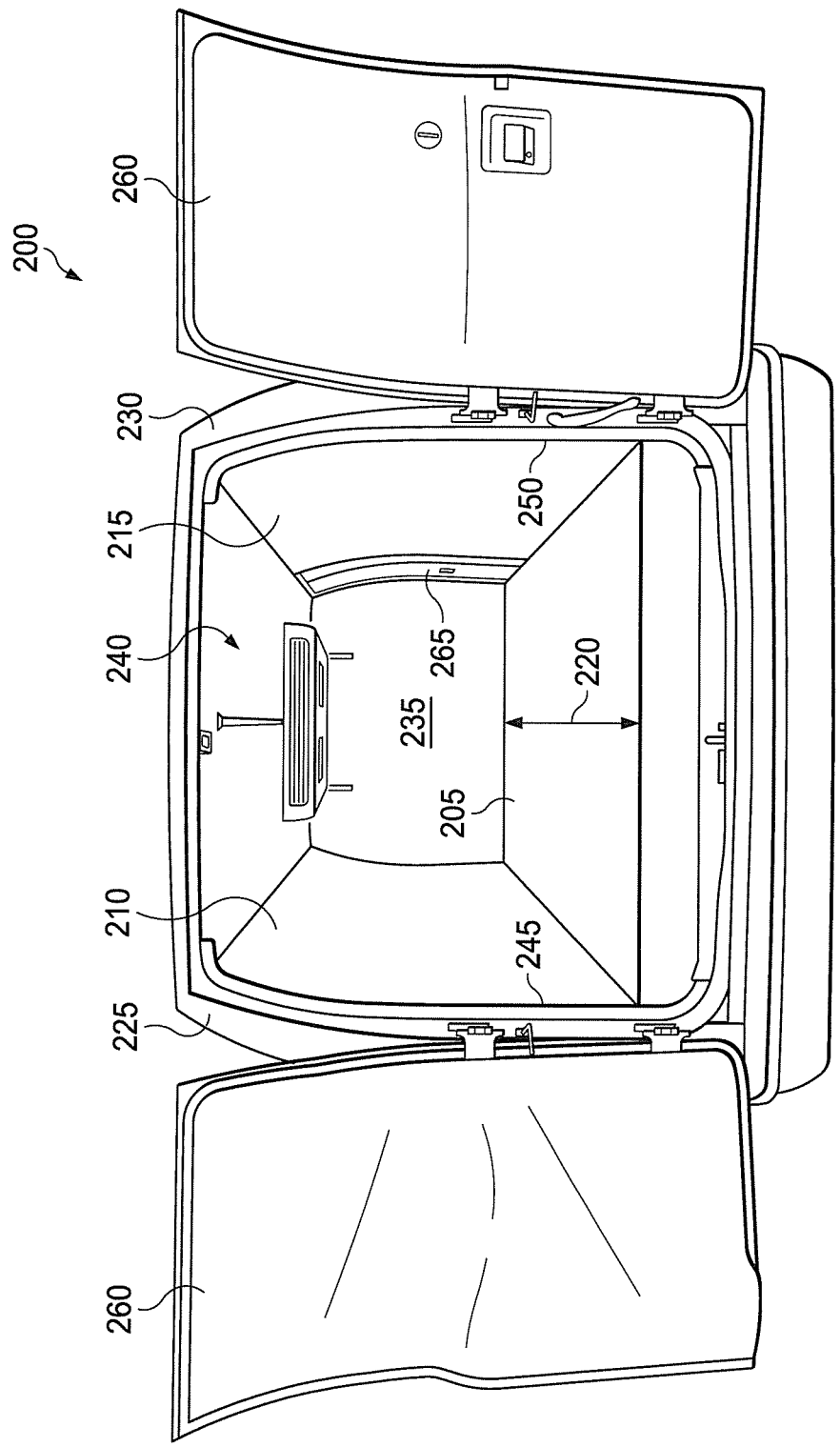
FIG. 2 illustrates a modified cargo van according to the present disclosure.

FIG. 2 illustrates a modified cargo van 200 according to the present disclosure. The embodiment of the modified cargo van 200 shown in FIG. 2 is for illustration only. Other embodiments could be used without departing from the scope of this disclosure. In certain embodiments, the modified cargo van 200 is modified, altered, or otherwise configured from the cargo van 100.

The modified cargo van 200 includes a flat finished floor surface 205. The finished floor surface 205 extends from a first side panel 210 to a second side panel 215 for an entire length 220 of a cargo area. An exterior portion of the first side panel 210 forms a first exterior side 225 of the modified cargo van 200. An exterior portion of the second side panel 215 forms a second exterior side 230 of the modified cargo van 200. The cargo area defined by the first side panel 210, the second side panel 215, and the finished floor surface 205 of the modified cargo van 200. In certain embodiments, the modified cargo van 200 includes a cargo barrier 235 that separates the cargo area from a drivers (or drivers and passenger) compartment. The modified cargo van 200 includes rear doors configured to provide access, via a rear opening, into the cargo area from outside the modified cargo van 200.

Unlike standard cargo vans, the finished floor surface 205 is uninterrupted by wheel well protrusions. That is, cargo may be securely stored across an entire width of the finished floor surface 205. The width at a point proximate to the wheels of the modified cargo van 200 is equal (or substantially equal to within less than an inch of variance) to a width of any portion of the finished floor surface 205 forward or aft of the location of the wheels. That is, the width of the cargo area (e.g., cargo bay) at the finished floor surface 205 is equal (or substantially equal to within less than an inch of variance) along an entire length of the cargo area.

Since the side panels 210, 215 are part of the exterior sides of the van, the finished floor surface 205 extends across a width of the modified van 200 from first side panel 210 to second side panel 215. Therefore, portions of the finished floor surface 205 extend over the rear wheels of the modified van 200. Additionally, the finished floor surface 205 extends across and entire rear opening 240 of the cargo area for the entire length 220 of the cargo area. In certain embodiments, the finished floor surface 205 extends beyond a first door jamb 245 and beyond a second door jamb 250 for the entire length 220 of the cargo area.

In certain embodiments, a top of the finished floor surface 205 is approximately 30" from a top of a ground surface (e.g., a roadway surface). In certain embodiments, the top of the finished floor surface 205 is within approximately 32" from a top of a ground surface (e.g., a roadway surface). In certain embodiments, at least one of the side panels 210, 215 includes a side door 265 and side opening that provides access to the interior of the cargo area from outside the modified cargo van 200. The side door 265 is used for access to the cargo bay from the side of the truck when the back is not accessible or for access to the cargo bay when parked on the side of the road in countries where traffic is on the right side of the street. In certain countries, like in Europe, where traffic is on the left side of the road, the side door 265 can be found on the left side of the modified cargo van 200. The side door 265 can exist on either side of the modified cargo van 200 anywhere along the side of the cargo bay, or in the alternative, no side door 265 could exist on the modified cargo van 200.

In certain embodiments, the cargo area is configured to maintain a specified temperature. That is, the finished floor surface 205, the side panels 210, 215, doors and a roof can be insulated and the cargo area refrigerated. The modified cargo van 200 can include insulated back doors 260. The insulated back doors 260 provide access to the refrigerated compartment from a rear of the modified cargo van 200. The insulated back doors 260 could either be a new component or could be the OEM back doors with insulation added. The OEM back doors can be modified or altered to include seals around the edges of the OEM side door to inhibit the flow of air and fluid such that the refrigerated compartment is airtight.

Figure 3:
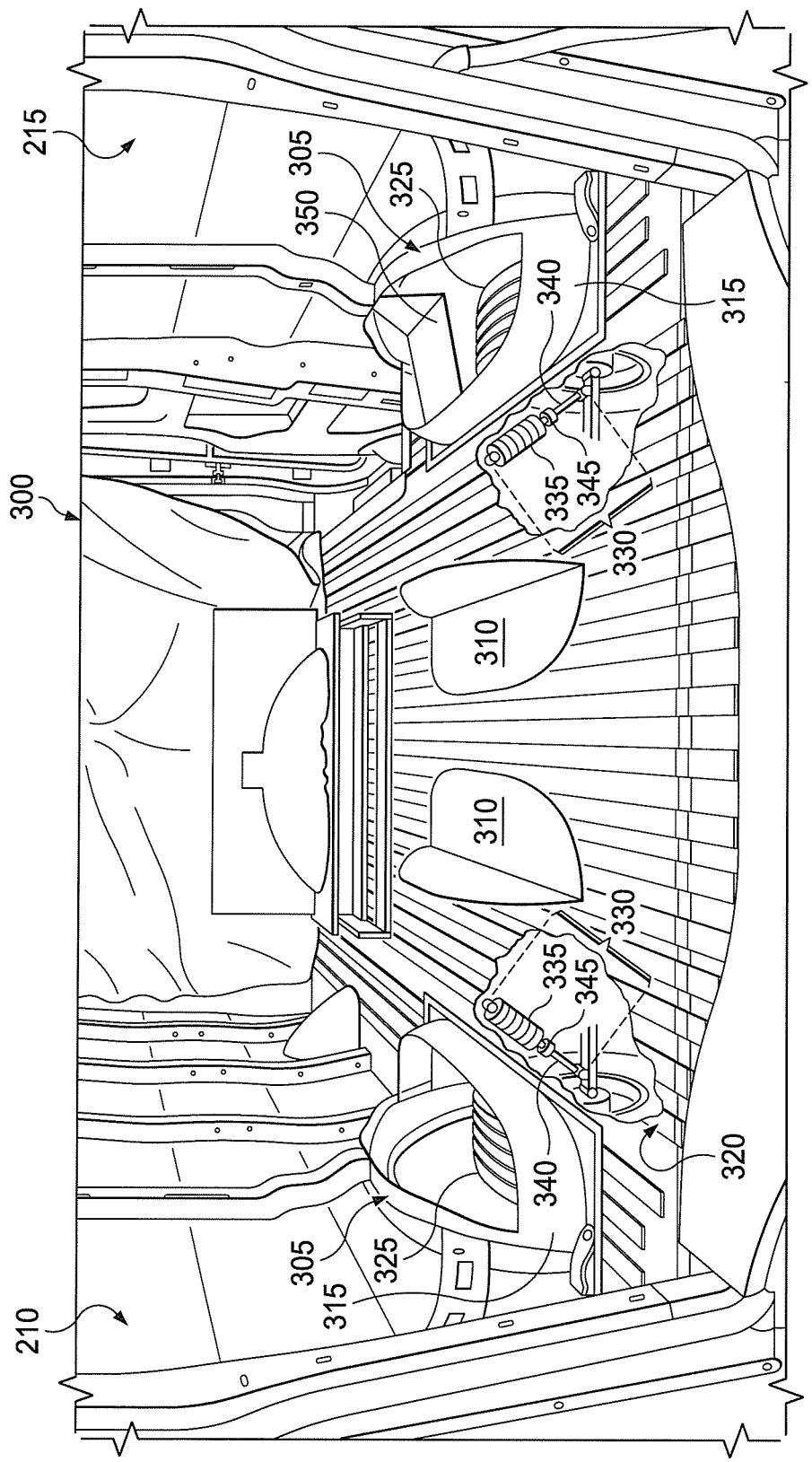
FIG. 3 illustrates a conversion of a cargo van 100 into a modified cargo van 200 according to the present disclosure.

FIG. 3 illustrates a conversion of a cargo van 100 into a modified cargo van 200 according to the present disclosure. The embodiment of the conversion 300 shown in FIG. 3 is for illustration only. Other embodiments could be used without departing from the scope of the present disclosure.

In certain embodiments, to maximize the flat floor space, such as when the refrigerated surfaces are installed, cutouts are made into the wheel wells 310. A vertical cut and a horizontal cut are made into the wheel well 310 and a portion of the wheel wells 310 are removed. The vertical cuts are be made as close to the side panels 210, 215 as possible. In the example shown in FIG. 3, the vertical cut performed in the wheel wells 305 is made at the seam that is used to connect the two pieces of the wheel well 305 and give additional support to the wheel well 305. In certain embodiments, the vertical cut is placed to align with a finished surface of the side panels 210, 215. For example, the vertical cut can be positioned such that the vertical cut aligns with a finished surface of an insulating material applied to the first side panel 210 to form the inner surface of the cargo side wall. The horizontal cut is placed at the desired height for finished floor of the modified cargo bay. The vertical and horizontal cuts take into consideration any planned slope in the floor or walls of the modified cargo bay. In certain embodiments, the verticals cut are made perpendicular to the finished floor and the horizontal cuts are made parallel to the finished floor. For certain functions, such as drainage concerns, the floor is configured to include a slight slope. If a slight slope in the floor is included, then the front or back side of the wheel well 305 is cut lower than the opposite side of the wheel well 305. Since some commodities require different packing or storage, any slope in the walls can be taken into consideration when placing the vertical cuts in the wheel wells 305.

A wheel well insert 310 is configured cover the void created by the removal of the wheel well cutout. The wheel well insert 310 is coupled to the remaining portion of the wheel wells 305 to increase the strength of the wheel wells 305. The wheel well insert 310 also provides support to the finished floor. Additionally, the wheel well insert 310 can be configured to provide support for insulated side walls to be installed in the modified cargo bay. The wheel well insert 310 can be coupled to the wheel well 305 by a fastening method, such as welding, riveting, or the like.

In certain embodiments, the horizontal remaining portions 315 of the wheel wells 305 provide support for an insulated floor of a refrigerated compartment. Because the original wheel well may not have been designed to support the weight of the entire compartment, additional support or braces can be added to the material remaining after the cutout portion is removed. An additional seem can be added to the top of the portion of the wheel well 305 where the vertical cut was made, vertical braces connecting to the floor, or any other suitable method of increasing the strength of the remaining portion of the wheel wells 305 can be added.

In the example shown in FIG. 3, the wheel well inserts 310 are configured as an angle bracket type insert. In certain embodiments, the wheel well inserts 310 include an additional component that couples with the remaining portion 315 of the wheel well 305 and connects at the floor. In certain embodiments, the wheel well insert 310 can be a single piece, or formed from a single piece of material, that stretches across the floor to the vertical cut of each wheel well 305. In certain embodiments, the single piece that reaches across the floor includes additional supports at points across the bottom of the insert that couple to the sub floor 320 to distribute the weight of the floor and insulation for the walls.

In certain embodiments, the original wheel wells 305 are formed from two pieces held together by a reinforcing seam. The inside portion is completely removed and replaced with a wheel well replacement section. The wheel well replacement section has a lower portion with a similar shape and size as the original wheel well with an upper portion the shape and size of the wheel well insert 310, as depicted in FIG. 3.

Removing the portion of the wheel wells and adding the insert reduces the clearance above the wheels 325. Wheel travel is taken into consideration to maintain the wheel 325 from bottoming out on the wheel well insert 310. Bottoming out of the wheel well insert 310 could cause serious damage to the body of the van, creating cracks or holes in the cargo bay, which can drastically reduce the efficiency, such as when the cargo bay is refrigerated.

In certain embodiments, to accommodate the reduced clearance of the rear wheels 325, the suspension on the rear wheels 325 of the van is modified to maintain space between the wheel 325 and the wheel well insert 310. The modified suspension 330 includes springs 335 with a higher spring constant or shock absorbers 340 with a higher viscous damping constant to allow for a lower profile of the van without risking damage to the body of the van or the wheel well insert 310. Increasing the strength of the suspension keeps the wheels 325 from bottoming on the wheel well insert 310. In certain embodiments, the modified suspension 330 is configured to not allow more than two inches of travel of the wheels 325.

In certain embodiments, a bump stop 345 is added to the suspension. The bump stop 345 is installed in the suspensions to limit the amount of a vertical travel of the vehicle with respect to the wheels 325. The bump stop 345 absorbs the force from the vertical travel of the axle or wheel and insulates the shock caused by impacts. The bump stop 345 is configured to stop a compression of one or more of the springs, the shocks, or both, to prevent the wheels 325 from contacting the wheel well insert 310. The bump stop 345 can be configured to ensure that a minimum gap is maintained between the wheels 325 and the wheel well insert 310. In certain embodiments, the bump stop 345 is a two inch lift block or restraining block that is configured to maintain a minimum of two inches of clearance between the wheel well insert 310 and the wheel 325.

In certain embodiments, a vibration pad is installed on the bottom or outside part of the wheel well inserts 310. The vibration pad decreases and spreads out the force of the impact if the wheels 325 contact the bottom of the wheel well inserts 310.

In certain embodiments, in order to maintain a suitable temperature for a refrigerated cargo space, insulation is added along the side panels 210, 215, under the finished floor 205, in the doors and roof of the modified cargo van. Insulation is usually made from materials with high thermal resistance, reducing the flow of heat into the refrigerated space by limiting conduction and convection. Insulation can be applied between the refrigerated walls and their corresponding walls of the van. Fiberglass and polyfoams are both insulation materials that could be used, but any suitable form of insulation may be used. A combination of layers of fiberglass alternated with layers of polyfoam increases the thermal resistance in the insulation layers. A finishing layer can be applied over the insulation layer.

The finished floor 205 includes a finished floor surface disposed over the sub-floor 320. The finished floor 205 surface is disposed at a height as defined by the horizontal cuts to the wheel wells 305. That is, the finished floor 205 surface is substantially parallel to a height of the horizontal remaining portions 315 of the wheel wells 305. The finished floor 205 can include an suitable surface for receiving and carrying cargo, such as synthetic or plastic liners, carpeting, paneling or a combination of these.

The side panels 210, 215 remain intact as originally installed. For example, the side panels 210, 215 can be the same as the side panels 140. Insulation is applied to the inside of the modified van along the side panels 210, 215. For increased heat reduction, a materials that acts as a radiant barrier can be used outside the van to reflect radiation.

In certain embodiments, if the OEM doors are to remain on the modified cargo van 200 for the retrofitting into a refrigerated van, the OEM doors are suitably insulated. Most vans are not meant for refrigeration and the OEM doors are not manufactured to keep heat outside the modified cargo van 200. In these cases, the OEM doors must be insulated. The OEM doors might also require changing or adding air tight seals around the edges of the OEM doors.

Figure 4:
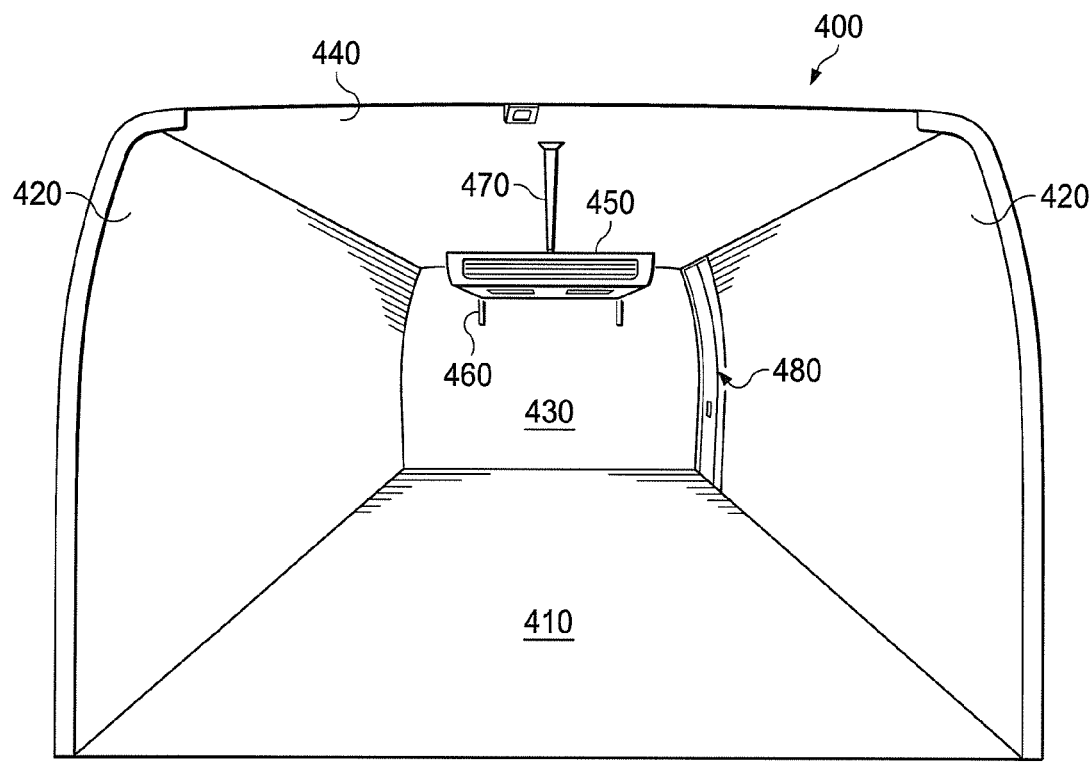
FIG. 4 illustrates a refrigeration compartment according to the present disclosure.

FIG. 4 illustrates a refrigeration compartment 400 according to the present disclosure. The embodiment of the refrigeration compartment 400 shown in FIG. 4 is for illustration only. Other embodiments could be used without departing from the scope of the present disclosure.

The refrigerated compartment 400 includes two insulated side walls 420, an insulated back wall 430, an insulated floor 410, an insulated ceiling 440 and a set of insulated rear doors (shown herein above with respect to in FIG. 2). The seams between the insulated floor 410, the insulated side walls 420, the insulated compartment barrier 430, and the insulated ceiling 440 are caulked to provide an airtight climate within the refrigerated compartment 400. The refrigerated compartment 400 includes a refrigeration unit 450. The refrigeration unit 450 can be is installed on the inside of the refrigerated compartment 400 or on an exterior of the modified cargo van 200. The pipes 460 of the refrigerating device 450 include a water and temperature resistant material coating to avoid decreasing the efficiency of the refrigerating device 450. Along with the refrigerating device 450, the refrigerated compartment 200 can include additional items, such as lighting 470, shelving, texture to the walls, meat rails, drains, etc.

In certain embodiments, the refrigerated compartment 400 includes an insulated side door 480. The insulated side door 480 is installed in the location where the side door was located. The insulated side door 480 provides access to the refrigerated compartment from the side of the truck when the back is not accessible or for access to the refrigerated compartment when parked on the side of the road in countries where traffic is on the right side of the street. The insulated side door 480 can exist on either side of the van anywhere along the side of the refrigerated compartment 400. In certain embodiments, the modified cargo van 400 does not include a side door. The insulated side door 480 could either be a new component or could be the OEM side door with insulation added.

The insulated floor 410 of the refrigerated compartment 400 is a flat surface configured for easy loading of cargo. The insulated floor 410 is mounted on the flat horizontal surface of the wheel well insert 310. Because of the combined weight of the refrigerated compartment 400 and the potential cargo to be stored in the refrigerated compartment 400, the insulated floor 410 requires greater support then was designed for the original wheel well 105. Mounts can be added throughout the cargo bay for the purpose of supporting the weight of the refrigerated compartment 400 full of cargo. The insulated floor 410 is substantially flat and substantially rectangular. As shown in FIG. 2, the insulated floor 410 does not have wheel wells or alternative wheel well covers protruding into the refrigerated compartment 400. The insulated floor 410 extends into clearance space of the preexisting wheel well increasing the width of the floor, while not sacrificing the height of the refrigeration compartment 400. As opposed to other conversions that merely install shelving around the wheel wells, the insulated floor 410 extends from insulated side wall 420 to insulated side walls 420, providing an enlarged storage area without the need for shelving.

The refrigerated compartment 400 can hold liquids or condensation can form on surfaces, requiring drainage. In one embodiment, the floor is installed on a slight slope to prevent pools of liquids forming in the refrigeration compartment 400. In another embodiment, the insulated floor 410 has a drain installed and a slight sloped towards the drain. The walls can also be made of material that reduces the buildup of liquids from condensation or from a lower friction coefficient.

Figure 5:
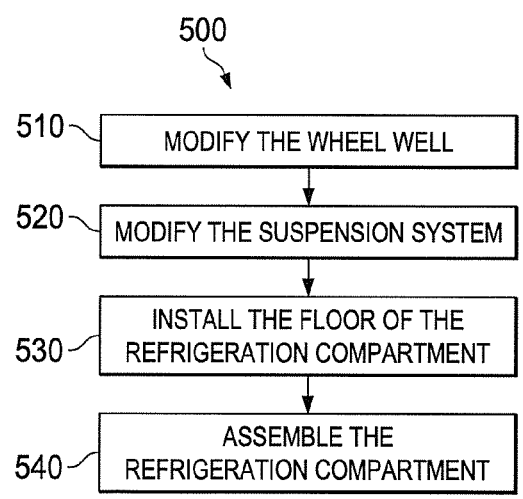
FIG. 5 illustrates a process for retrofitting a refrigeration compartment of a van according to embodiments of the present disclosure.

FIG. 5 illustrates a process 500 for retrofitting a refrigeration compartment of a van according to embodiments of the present disclosure. While the flowchart depicts a series of sequential steps, unless explicitly stated, no inference should be drawn from that sequence regarding specific order of performance of steps, or portions thereof, serially rather than concurrently or in an overlapping manner, or performance the steps depicted exclusively without the occurrence of intervening or intermediate steps. The process depicted in the example is implemented with a van.

In block 510, the wheel well is modified in the cargo bay of the van. In one embodiment, a section is cut out of the wheel well and an angled replacement piece 350 is inserted in the wheel well. The section cut out is an upper portion of the wheel well towards the inside of the cargo bay of the van. A horizontal cut is made substantially parallel to the floor and a vertical cut is made substantially perpendicular to the floor. In certain embodiments, the horizontal cut can be made at a slight angle with respect to the floor of the van for the purpose of drainage depending on the application of the refrigerated compartment. The angled replacement piece 350 is meant to support an insulated floor of the refrigerated compartment and to cover the opening created by the removed part of the wheel well.

In certain embodiments, an inner portion of the wheel well is removed and a replacement piece is inserted in the wheel well. The replacement piece includes a curved lower portion to match the removed portion of the wheel well, while the upper portion of the replacement piece is similar to the insert portion in the other embodiment. The upper portion includes a horizontal surface meant for supporting the floor of the refrigerated compartment and a vertical portion meant for aligning a sidewall of the refrigerated compartment. The replacement piece connects in a similar manner to the removed inner portion of the wheel well.

In block 520, the suspension system of the van is modified to reduce the travel of the wheel to accommodate the reduced clearance space of the wheel due to the modification of the wheel well. In order to reduce the travel of the wheel, the springs on the van can be replaced with springs 335 that have a higher spring constant suitable for the amount of travel allowable for the wheel. The shock absorbers can also be replaced with shock absorbers 340 with a higher viscous damping constant suitable for the amount of travel for the wheel. A bump stop can also be added to ensure that the wheel does not travel enough to cause the wheel to bottom out potentially damaging the wheel and the body of the van. In some embodiments, a vibration pad may be added to the bottom of the insert.

In block 530, the floor of the refrigeration compartment is mounted on the horizontal surface of the wheel well insert. Assembling a refrigeration compartment comprises coupling an insulated floor to the modified wheel well of the van. The insulated floor is coupled to the horizontal surface of the wheel well inserts to be substantially flat. The insulated floor is substantially rectangular to provide the most efficient storage of cargo in the refrigerated compartment.

In block 540, a refrigeration compartment is assembled in the cargo bay of the van. The two insulated side walls are couple to the vertical surface of the wheel well insert of the modified wheel wells of the van on either side of the insulated floor. An insulated back wall is coupled with the insulated floor and the two insulated side walls. An insulated ceiling is coupled to the top of the insulated side walls and the insulated back wall. A set of insulated doors are coupled to the two insulated side walls opposite of the insulated back wall. In other embodiments, instead of coupling an insulated door to the insulated floor and two insulated side walls, the OEM back doors have insulation added. The seams between the walls are caulked in order to create an airtight seal. In some embodiments, a refrigeration unit is installed in the refrigeration compartment.

Although various features have been shown in the figures and described above, various changes may be made to the figures. For example, the size, shape, arrangement, and layout of components shown in FIGS. 1 through 4 are for illustration only. Each component could have any suitable size, shape, and dimensions, and multiple components could have any suitable arrangement and layout. Also, various components in FIGS. 1 through 4 could be combined, further subdivided, or omitted and additional components could be added according to particular needs. Further, each component in a device or system could be implemented using any suitable structure(s) for performing the described function(s). In addition, while FIG. 5 illustrates various series of steps, various steps in FIG. 5 could overlap, occur in parallel, occur multiple times, or occur in a different order. The embodiments described herein are provided for illustration and explanation. One or more features from any of the described embodiments can be incorporated into other embodiments without departing from the scope of the disclosure.

What is claimed is:

1. A van comprising:
    a first side panel of the van, wherein an exterior portion of the first side panel forms a first exterior side of the van and an interior portion of the first side panel forms a first planar vertical surface of a cargo area;
    a second side panel of the van, wherein an exterior portion of the second side panel forms a second exterior side of the van and an interior portion of the second side panel forms a second planar vertical surface of the cargo area; and
    a planar floor surface configured to extend from the first planar vertical surface to the second planar vertical surface for an entire length of the cargo area, the cargo area defined by the first planar vertical surface, the second planar vertical surface, and the planar floor surface of the van.

2. The van of claim 1, wherein the cargo area comprises a refrigerated cargo area.

3. The van of claim 1, further comprising a refrigeration unit and wherein the first side panel, second side panel and planar floor surface are insulated.

4. The van of claim 1, further comprising a side door disposed on one of the first side panel and the second side panel.

5. A van comprising:
    a first side panel of the van, wherein an exterior portion of the first side panel forms a first exterior side of the van;
    a second side panel of the van, wherein an exterior portion of the second side panel forms a second exterior side of the van; and
    a planar floor surface configured to extend from the first side panel to the second side panel for an entire length of a cargo area, the cargo area defined by the first side panel, the second side panel, and the planar floor surface of the van,
    wherein at least a portion of the planar floor surface is disposed over a rear wheel of the van, further comprising a modified suspension configured to maintain a minimum clearance between the rear wheel and an underside of the planar floor surface.

6. The van of claim 4, wherein a modified suspension comprises one of: a plurality of shock absorbers with a higher viscous damping constant.

7. The van of claim 4, wherein a modified suspension comprises a plurality of springs with a higher spring constant.

8. The van of claim 4, wherein a modified suspension comprises a bump stop configured to maintain the minimum distance between the rear wheel and an underside of the planar floor surface.

9. The van of claim 1, further comprising a barrier disposed between the cargo area and a driver compartment.

10. The van of claim 1, wherein the planar floor surface is disposed approximately thirty inches from a ground surface.

11. A method for converting a van, the method comprising:
    modifying a wheel well in the cargo bay of the van;
    modifying a suspension system of the van; and
    installing insulated planar floor surface configured to extend from a first side panel of the van to a second side panel of the van for an entire length of a cargo area, the cargo area defined by the first side panel, the second side panel, and the planar floor surface of the van, wherein an exterior portion of the first side panel forms a first exterior side of the van and an exterior portion of the second side panel forms a second exterior side of the van.

12. The method of claim 11, wherein modifying the wheel well comprises:
    cutting a section out of the wheel well; and
    inserting an angled replacement piece in the wheel well, wherein the angled replacement piece is meant to support a floor of the refrigerated compartment.

13. The method of claim 11, wherein modifying the wheel well comprises:
    removing an inner portion of the wheel well; and
    inserting an replacement piece in the wheel well, wherein the replacement piece has a horizontal surface configured to support the planar floor surface and a vertical portion configured to align a sidewall of the van, wherein.

14. The method of claim 11, wherein modifying the suspension system comprises:
    replacing a plurality of springs in the suspension system with a plurality of springs with a higher spring constant;
    replacing a plurality of shock absorbers in the suspension system with a plurality of shock absorbers with a higher viscous damping constant; and
    installing a bump stop.

15. The method claim 11, the method further comprising: assembling a refrigeration compartment.

16. The method claim 15, wherein assembling the refrigeration compartment comprises:

coupling two insulated side walls with the modified wheel wells of the van on either side of the insulated floor;

coupling an insulated back wall with the insulated floor and the two insulated side walls;

coupling an insulated ceiling to the top of the insulated side walls and the insulated back wall; and coupling a set of insulated doors to the two insulated side walls opposite of the insulated back wall.

17. The method claim 15, wherein assembling a refrigeration compartment comprises:

coupling two insulated side walls with the modified wheel wells of the van on either side of the insulated floor;

coupling an insulated back wall with the insulated floor and the two insulated side walls;

coupling an insulated ceiling to the top of the insulated side walls and the insulated back wall; and adding insulation to a set of uninsulated back doors of the van.

18. The method of claim 11, further comprising installing a barrier between the cargo space and a driver compartment.

19. The method of claim 11, wherein the planar floor surface is disposed approximately thirty inches from a ground surface.

20. The method of claim 11, wherein the van is a class 1 van as defined by the United States Department of Transportation.

* * * * *